United States Patent Office 3,111,527
Patented Nov. 19, 1963

3,111,527
AMINE COMPOUNDS AND METHODS FOR
THEIR PRODUCTION
Erik Fred Godefroi, Ann Arbor, Mich., assignor to Parke, Davis & Company, Detroit, Mich., a corporation of Michigan
No Drawing. Filed Mar. 14, 1962, Ser. No. 179,777
12 Claims. (Cl. 260—330.5)

This invention relates to novel dibenzothiophenamines and methods for producing the same. In particular, the invention relates to polyhydro-N-methyl-9a(5aH)-dibenzothiophenamines which in free base form may be represented by the structural formulas

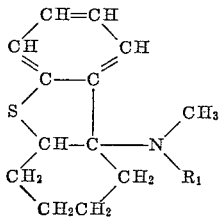

and

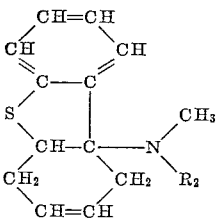

and acid addition salts thereof; where $R_1$ represents hydrogen or the ethyl radical and $R_2$ represents hydrogen or the methyl radical.

The products possess useful pharmacological properties. In particular, they have pronounced central nervous system depressant activity and are characterized by relatively low toxicity. Hence, they have application as central nervous depressant agents. The products in suitable dosage form can be administrated orally or parenterally. The cataleptoid and anticonvulsant activities of the compounds of the invention are particularly notable. For example, maximum cataleptoid activity is observed in standard tests using pigeons as test animals, at dosages as low as 6 mg./kg. Desirably, the action as shown in monkeys is relatively long in duration thereby permitting greater control of the depressant state.

In accordance with one method for the production of the products of the invention, the carbamate group of an alkyl carbamate of the formula

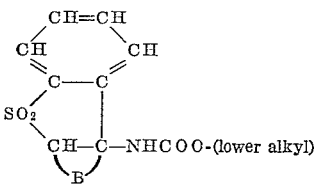

is reduced to a monomethylamine group; where B is a butylene ($—CH_2CH_2CH_2CH_2—$) or $\Delta^2$-butylene ($—CH_2—CH=CH—CH_2—$) radical and the lower alkyl radical is an alkyl radical containing not more than four carbon atoms. The reduction can be carried out by treating the alkyl carbamate with a complex oxidizable metal hydride such as lithium aluminum hydride, in an unreactive non-hydroxylic medium such as anhydrous ether or anhydrous hydrocarbon and then decomposing the product with an aqueous medium such as an aqueous alkali metal hydroxide solution. For purposes of reduction, one uses the reducing agent in an amount at least sufficient to react with both the carbonyl and sulfonyl groups. For convenience, the reaction with the metal hydride is carried out at a temperature in the range from 20 to 100° C. The reaction can also be carried out at lower temperature for longer periods or at higher temperature at the risk of thermal decomposition of the desired product.

According to another method of production, 6,9-dihydro-N,N-dimethyl-9a(5aH) - dibenzothiophenamine is produced by the N-methylation of 6,9-dihydro-N-methyl-9a(5aH)-dibenzothiophenamine. Methylation is accomplished by reaction of the methylamine with a mixture of formaldehyde and formic acid. No solvents are required, and the reaction is favored by heating the reaction mixture, preferably at steam bath temperature.

In another embodiment of the invention, N-ethyl-6,7,8,9 - tetrahydro-N-methyl-9a(5aH)-dibenzothiophenamine is produced by first N-acetylating 6,7,8,9-tetrahydro-N-methyl-9a(5aH)-dibenzothiophenamine with at least one equivalent of a reactive acetic acid derivative such as acetic anhydride or acetyl chloride and then reducing the carbonyl group of the acetamide so produced. For the acetylation, inert organic solvents can be employed such as ethers, chlorinated hydrocarbons and the like. The reaction proceeds at room temperature and external heating is therefore unnecessary. The reduction is preferably carried out by reaction with a complex oxidizable metal hydride such as lithium aluminum hydride, in a non-hydroxylic solvent such as an ether, hydrocarbon or the like, and the subsequent decomposition of the reaction product with an aqueous medium.

In still another embodiment of the invention the acid addition salts of the free base products having the formulas first set forth above are provided by reacting the free base with an organic or inorganic acid. Some examples of the acid addition salts of the invention are the inorganic acid addition salts such as the hydrochloride, hydrobromide, sulfate and phosphate and organic acid addition salts such as the carbonate, benzoate, acetate, citrate, gluconate, ascorbate and benzenesulfonate. The acid addition salts are conveniently formed by reacting the free base with an equivalent amount or excess of the acid in a solvent or medium in which the salt is insoluble thereby permitting recovery of the desired salt as a solid phase. The acid addition salts can be converted to the free bases by reaction with a base such as sodium hydroxide. Whereas both the free base and acid addition salt forms of the products are useful for the purposes of the invention, the salts are generally preferred in those cases where increased water solubility is required. The invention contemplates the acid addition salts broadly. Those salts which are unsuited to particular uses, as for example uses in which toxicity is a problem, are nevertheless useful as intermediates, being readily convertible to non-toxic acid addition salts by the means described.

The alkyl esters of the polyhydro-9a(5aH)-dibenzothiocarbamic acid, 5,5-dioxides used as starting materials in the practice of the invention can be prepared from known material in a series of process steps, in the following manner: 3-thianaphthenecarboxylic acid is oxidized to the corresponding 1,1-dioxide, the 1,1-dioxide is reacted with butadiene to obtain 6,9-dihydro-9a(5aH)-dibenzothiophenecarboxylic acid, 5,5-dioxide, the corresponding 6,7,8,9-tetrahydro-9a(5aH)-dibenzothiophenecarboxylic acid, 5,5-dioxide being obtained from the latter by catalytic hydrogenation, the two resulting dihydro and tetrahydro compounds are converted to the corresponding amides by reaction first with thionyl chloride and then with ammonia, and the respective amides are reacted with bromine and sodium alkoxide in a lower alkanol to produce by way of the isocyanate the desired alkyl carbamates.

The invention is illustrated by the following examples.

*Example 1*

Four grams of 6,7,8,9-tetrahydro-9a(5aH)-dibenzothiophenecarbamic acid methyl ester, 5,5-dioxide is extracted into a refluxing slurry (Soxhlet) of lithium aluminum hydride (8 g.) in ether (400 ml.). The reaction mixture is stirred for two days and is then decomposed by adding first 8 ml. of water, then 6 ml. of 5 N sodium hydroxide solution and finally 27 ml. of water. The mixture is filtered and a slight excess of hydrogen chloride in isopropyl alcohol is added to the filtrate. The product which precipitates, 6,7,8,9-tetrahydro-N-methyl-9a(5aH)-dibenzothiophenamine hydrochloride, is collected and recrystallized from methanol-ether; M.P. 179–180° C. The free base is obtained from the hydrochloride by treating an aqueous solution of the latter with sodium hydroxide solution, extracting with ether and removing the ether from the extract. The hydrobromide is obtained by treating an ethereal solution of the free base with a slight excess of hydrogen bromide in ether. A citrate is obtained by adding a solution of citric acid in methanol to a solution of the free base in methanol and concentrating the mixture.

The carbamate starting material can be prepared by the following procedure: A solution of 13.5 g. of 3-thianaphthenecarboxylic acid in 60 ml. of acetic acid containing 45 ml. of 30% hydrogen peroxide is refluxed for 20 minutes and the mixture is poured into ice water. The product which separates, 3-thianaphthenecarboxylic acid, 5,5-dioxide, is collected and dried; M.P. 207–212° C. A slurry of 314 g. of the product in two liters of xylene containing one gram of hydroquinone is added to a solution of two liters of xylene, 500 ml. of toluene and 250 ml. of butadiene at −70° C. The mixture is then heated for 24 hours at 120° C. in a sealed vessel, cooled and repeatedly extracted with 2 N sodium hydroxide solution. The alkaline extracts are combined, acidified and the crystalline product, 6,9-dihydro-9a(5aH)-dibenzothiophenecarboxylic acid, 5,5-dioxide, is collected; M.P. 186–188° C. A solution of the product (200 g.) in one liter of 95% ethyl alcohol containing platinum oxide (one gram) is hydrogenated by shaking in the presence of a hydrogen atmosphere. When the theoretical amount of hydrogen has been absorbed, the catalyst is removed by filtration. The filtrate is concentrated under vacuum and the product extracted with boiling water. On cooling the extracts, the product, 6,7,8,9-tetrahydro - 9a(5aH)-dibenzothiophenecarboxylic acid, 5,5-dioxide, separates and is collected; M.P. 168–169° C. A solution of the product (128 g.) in 53 ml. of thionyl chloride and 450 ml. of toluene is refluxed for 18 hours, and the mixture is concentrated by removal of the solvent and excess thionyl chloride under vacuum. The residual product, 6,7,8,9 - tetrahydro-9a(5aH)-dibenzothiophenecarboxylic acid chloride, 5,5-dioxide, is dissolved in toluene and the solution added dropwise with stirring to one liter of concentrated ammonium hydroxide at −7 to 0° C. The resulting mixture is stirred overnight. The product which separates, 6,7,8,9-tetrahydro-9a(5aH)-dibenzothiophenecarboxylic acid amide, 5,5-dioxide, is collected and recrystallized from 5% aqueous sodium bicarbonate solution; M.P. 192–193° C. The product (109 g.) is added with stirring at 4° C. to sodium methoxide, freshly prepared from 47 g. of sodium in two liters of methanol. Bromine (26.4 ml.) is then added dropwise while maintaining the temperature below 10° C. The resulting mixture is heated at reflux temperature for two hours, cooled, neutralized with acetic acid and distilled under vacuum to remove about one-half of the solvent. On cooling, the crystalline product, 6,7,8,9-tetrahydro - 9a(5aH) - dibenzothiophenecarbamic acid methyl ester, 5,5-dioxide, is recovered in crystalline form; M.P. 198–199° C. on recrystallization from water.

*Example 2*

A solution of 1.6 g. of acetic anhydride in 20 ml. of dichloromethane is added to 6,7,8,9-tetrahydro-N-methyl-9a(5aH)-dibenzothiophenamine obtained by treating an aqueous solution of 3.9 g. of the corresponding amine hydrochloride with an equivalent quantity of sodium hydroxide solution, extracting the resulting free base with ether and removing ether from the extracts. The mixture is allowed to stand overnight. The solvent is removed under vacuum, 20 ml. of ether is added, and the resulting ethereal solution is washed first with 15 ml. of normal hydrochloric acid, then with 5% aqueous sodium bicarbonate solution, and finally with water. The organic phase is dried and added to a slurry of lithium aluminum hydride (4 g.) in ether (400 ml.). After standing for 16 hours with stirring, the mixture is decomposed by adding first 4 ml. of water, then 3 ml. of 5 N sodium hydroxide solution and finally 22 ml. of water. The resulting mixture is dried over magnesium sulfate, filtered, and the filtrate is distilled under vacuum. The product, N-ethyl-6,7,8,9-tetrahydro - N - methyl-9a(5aH)-dibenzothiophenamine, is obtained as the fraction boiling between 108–116° C. at 0.12 mm. The amine hydrochloride is prepared by treating an ethereal solution of the free base with a slight excess of hydrogen chloride in isopropyl alcohol. The hydrobromide is obtained by adding a slight excess of hydrogen bromide to a solution of the free base in ether.

*Example 3*

Eighteen grams of 6,9-dihydro-9a(5aH)-dibenzothiophenecarbamic acid methyl ester, 5,5-dioxide, is extracted into a refluxing slurry of lithium aluminum hydride (36 g.) in ether (2 l.). Stirring is then continued for 16 hours after which the mixture is decomposed by adding first 36 ml. of water, then 27 ml. of 5 N sodium hydroxide solution and finally 120 ml. of water. The resulting mixture is filtered, and the solvent is removed under vacuum. The free base product, 6,9-dihydro-N-methyl-9a(5aH)-dibenzothiophenamine is obtained by distillation as the fraction boiling at 100–104° C./0.08 mm. The hydrochloride is obtained by adding a slight excess of hydrogen chloride in isopropanol to a solution of the free base in ether and separating the crystalline product which forms; M.P. 169–170° C. The hydrobromide is prepared by treatment of an ethereal solution of the free base with hydrogen bromide in ether.

The carbamate starting material can be prepared by the following procedure: A solution of 60 g. of 6,9-dihydro-9a(5aH)-dibenzothiophenecarboxylic acid, 5,5-dioxide, 18.2 ml. of thionyl chloride and 200 ml. of benzene is heated at reflux temperature for about 20 hours. The mixture is cooled, 70 ml. of toluene is added, and the resulting mixture is added dropwise to 100 ml. of concentrated ammonium hydroxide at 6° C. Stirring is continued at room temperature for 16 hours and the product which separates, 6,9-dihydro-9a(5aH)-dibenzothiophenecarboxylic acid amide, 5,5-dioxide, is collected by filtration and dried; M.P. 203–204° C. Five grams of the product is added to methanolic sodium methoxide prepared from 2.2 g. of sodium in 180 ml. of methanol. The resulting mixture is cooled to −20° C. and 1.2 ml. of bromine is added. The mixture is heated at reflux temperature for two and one-half hours and the solvent is removed under reduced pressure. The residual product is 6,9-dihydro-9a(5aH)-dibenzothiophenecarbamic acid methyl ester, 5,5-dioxide; M.P. 185–186° C. after recrystallization from water.

*Example 4*

A mixture of formic acid (2.3 ml.), formaldehyde (37%, 2.4 g.) and 6,9-dihydro-N-methyl-9a(5aH)-dibenzothiophenamine (5.5 g.) is heated at steam bath temperature for four hours. The mixture is cooled, 23 ml. of 5 N sodium hydroxide solution is added, and the amine which separates is extracted with three volumes of ether. The combined extracts are washed with water, dried over magnesium sulfate and evaporated to give a residue of the free base 6,9-dihydro-N,N-dimethyl-9a(5aH)-dibenzothiophenamine. The hydrochloride is obtained by treating an ethereal solution of the free base with a slight excess of hydrogen chloride in isopropanol and separating the crystalline product which forms; M.P. 146–147° C. A water-soluble citrate is obtained by mixing a solution of the free base in methanol with a solution of citric acid in methanol and concentrating the mixture to a small volume.

I claim:

1. A member of the class consisting of polyhydro-N-methyl-9a(5aH)-dibenzothiophenamines having the formulas

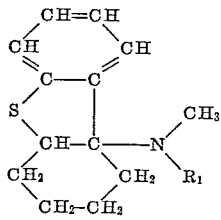

and

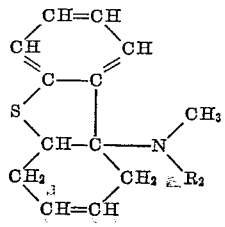

and pharmaceutically acceptable acid addition salts thereof; where $R_1$ is a member of the class consisting of hydrogen and ethyl and $R_2$ is a member of the class consisting of hydrogen and methyl.

2. 6,7,8,9 - tetrahydro-N-methyl-9a(5aH)-dibenzothiophenamine.

3. Pharmaceutically acceptable acid addition salts of the amine of claim 2.

4. 6,7,8,9 - tetrahydro-N-methyl-9a(5aH)-dibenzothiophenamine hydrochloride.

5. N - ethyl - 6,7,8,9-tetrahydro-N-methyl-9a(5aH)-dibenzothiophenamine.

6. Pharmaceutically acceptable acid addition salts of the amine of claim 5.

7. 6,9 - dihydro-N-methyl - 9a(5aH)-dibenzothiophenamine.

8. Pharmaceutically acceptable acid addition salts of the amine of claim 7.

9. 6,9 - dihydro - N-methyl-9a(5aH)-dibenzothiophenamine hydrochloride.

10. 6,9 - dihydro-N,N-dimethyl-9a(5aH)-dibenzothiophenamine.

11. Pharmaceutically acceptable acid addition salts of the amine of claim 10.

12. 6,9 - dihydro-N,N-dimethyl-9a(5aH)-dibenzothiophenamine hydrochloride.

References Cited in the file of this patent

FOREIGN PATENTS 701,267    Great Britain _____ Dec. 23, 1953

OTHER REFERENCES

Noller: Chemistry of Organic Compounds, second edition, 1957, pages 234–37.